US008775660B2

(12) United States Patent
Anschutz et al.

(10) Patent No.: US 8,775,660 B2
(45) Date of Patent: *Jul. 8, 2014

(54) BANDWIDTH AND TOPOLOGY MANAGEMENT DEVICE FOR HOME NETWORKS

(75) Inventors: Thomas Anschutz, Conyers, GA (US); Randy Zimler, Gainesville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 193 days.

This patent is subject to a terminal disclaimer.

(21) Appl. No.: 13/015,695

(22) Filed: Jan. 28, 2011

(65) Prior Publication Data

US 2011/0182296 A1 Jul. 28, 2011

Related U.S. Application Data

(63) Continuation of application No. 10/699,294, filed on Oct. 30, 2003, now Pat. No. 7,904,578.

(51) Int. Cl.
*G06F 15/16* (2006.01)
(52) U.S. Cl.
USPC ............. 709/231; 379/399.01; 379/399.02; 455/42; 455/63.3
(58) Field of Classification Search
USPC ........... 709/231; 379/399.01, 399.02; 455/42, 455/63.3
See application file for complete search history.

(56) References Cited

U.S. PATENT DOCUMENTS

| 4,839,894 | A * | 6/1989 | Rudish et al. ................. 370/497 |
| 6,526,581 | B1 * | 2/2003 | Edson ............................ 725/74 |
| 6,781,981 | B1 * | 8/2004 | Kimbrough ................... 370/352 |
| 6,781,989 | B1 * | 8/2004 | Acharya ....................... 370/392 |
| 6,947,480 | B2 * | 9/2005 | Beale et al. ................... 375/229 |
| 7,039,858 | B2 * | 5/2006 | Humpleman et al. ........ 715/205 |
| 7,154,996 | B2 * | 12/2006 | Strauss ...................... 379/93.08 |
| 7,315,886 | B1 * | 1/2008 | Meenan et al. .............. 709/219 |
| 2003/0095543 | A1 * | 5/2003 | Oi ................................. 370/352 |
| 2003/0231641 | A1 * | 12/2003 | Ryoo ........................... 370/401 |
| 2004/0120508 | A1 * | 6/2004 | Sajadi et al. ............. 379/399.01 |
| 2004/0190447 | A1 * | 9/2004 | Dacosta ....................... 370/229 |
| 2004/0233900 | A1 * | 11/2004 | Andersen et al. ............ 370/352 |
| 2006/0051094 | A1 * | 3/2006 | Moriwaki et al. .............. 398/84 |

OTHER PUBLICATIONS

"Home Networking", The International Engineering Consortium—Web ProForum Tutorials CD-ROM, http://www.iec.org/pubs/proceedings/2002/tutorials_vol19.html, 21 pages.

* cited by examiner

*Primary Examiner* — Ario Etienne
*Assistant Examiner* — Michael C Lai
(74) *Attorney, Agent, or Firm* — Scott P. Zimmerman, PLLC (57) ABSTRACT

Systems, methods, and equipment for use in the management of network topology and bandwidth for computing networks are provided. In an illustrative implementation of a device acting as a patch panel is provided. The patch panel works on both the physical wire and on the frequencies of the wire to route data to appropriate destination points. For example, both ADSL and telephony could be bridged among copper wires, using several independent busses. Home Phone Network Alliance Association (HPNA) standardized data could either be bridged among wires, or connected to an internal switching device, that would store and forward the native Ethernet packets used by HomePNA in a way similar to that done by Ethernet switches today. Additionally, an Ethernet uplink could attach the HPNA ports to a larger network or to a DSL Modem, and HPNA/ADSL could be removed from wires that might have privacy concerns or otherwise need filters to perform properly.

20 Claims, 7 Drawing Sheets

BANDWIDTH AND TOPOLOGY MANAGEMENT DEVICE FOR HOME NETWORKS

CROSS-REFERENCE TO RELATED APPLICATIONS

This application is a continuation of U.S. application Ser. No. 10/699,294, filed Oct. 30, 2003, now issued as U.S. Pat. No. 7,904,578, and incorporated herein by reference in its entirety.

FIELD OF THE INVENTION

The present invention relates to network topology devices, and, more particularly, to devices for us in the management of bandwidth and network topology for home telephone wired networks.

BACKGROUND OF THE INVENTION

Home networking is the collection of elements that process, manage, transport, and store information, enabling the connection and integration of multiple computing, control, monitoring, and communication devices in the home. Until recently, the home network has been largely ignored. However, the rapid proliferation of personal computers (PCs) and the Internet in homes, advancements in telecommunications technology, and progress in the development of smart devices have increasingly emphasized the last one hundred feet of any consumer-related network (i.e., the home). Accordingly, there has been surge in the adoption and practice of home networking. There are several trends that contribute to the growing need and the potential success of home networking.

The Internet elicits many changes in the workplace. These changes, in turn, create a growing need for home networks. Driven by a changing corporate culture, cost cutting measures, and clean-air acts that demand less travel to and from work, many employers have implemented telecommuting practices. To implement these practices, information technology (IT) managers must not only connect telecommuters to the corporate local-area network (LAN) and intranet but provide voice solutions as well. To conduct business properly, telecommuters must access files and stored network information and therefore require a high-quality, secure voice network able to sustain multiple lines. For this reason and others Internet access in the home is on the climb.

Coupled with an increase in Internet use, there is technological change occurring in the average home. An increasing number of smart devices are being developed and deployed that allow users to control and monitor events in consumer-based appliances, home electronics, and home security systems. As these devices become more common, a need arise for a home networking strategy that will allow data, voice, and smart devices to be accessible throughout the home and remotely at any time. The key to the prevalence of home networking, however, is the ability of home networking product and service providers to deliver products and/or services that are simple and reliable to consumers. If the process is not maintenance-free, easy to use, and quick to install, it will not likely be embraced by consumers. While consumers desire the sophisticated functionality of a local area network—data networking, shared Internet access, and smart device control—they do not wish to engineer or administer a complex system. Generally, consumers seek plug-and-play functionality, such that—much like telephones—networked PCs should just work.

Figure 1:
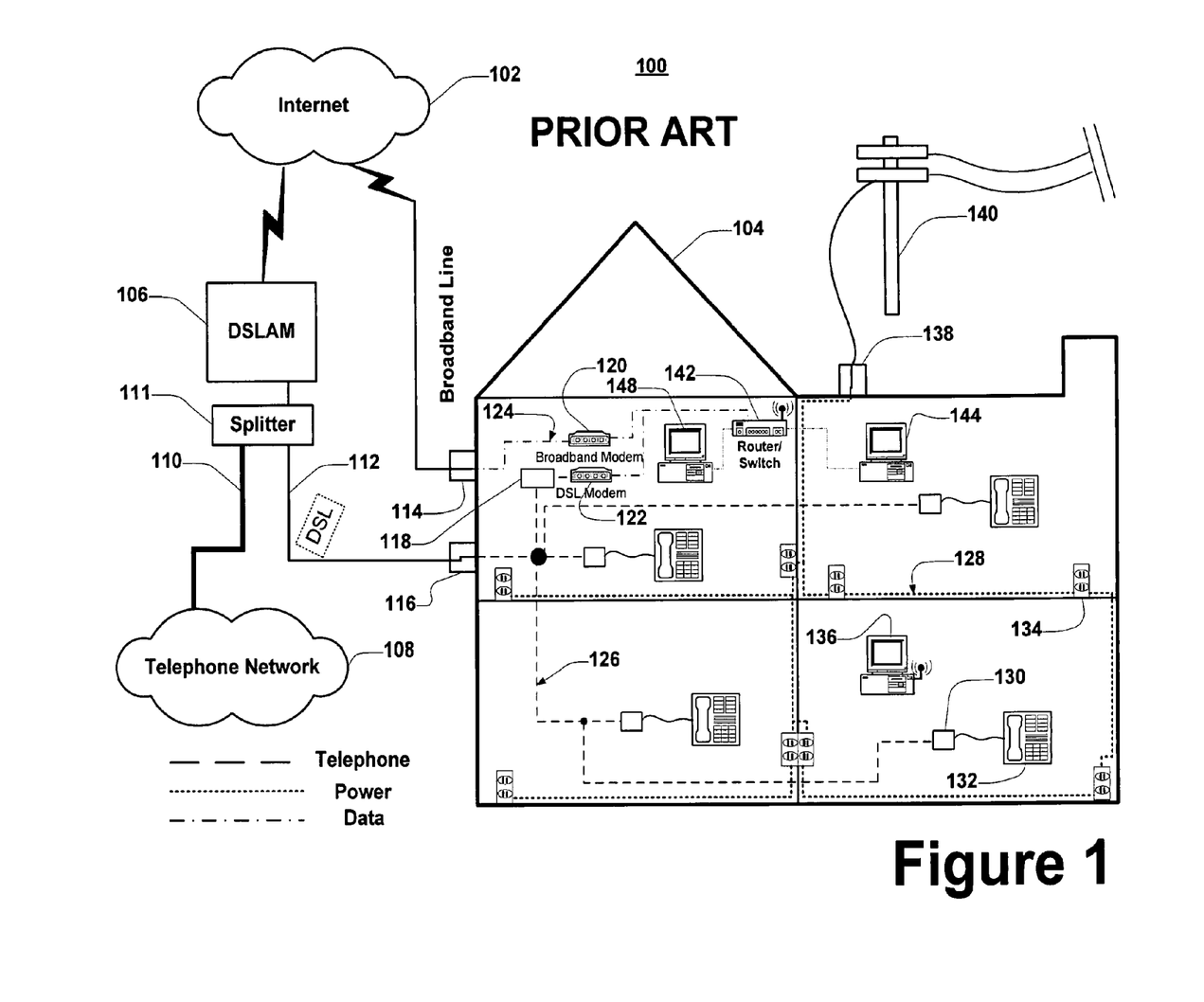
FIG. 1 is a block diagram of a prior art home networking environment.

Currently, there are several home networking solutions available to consumers. Wired home-networking technologies were the first introduced solutions. These early networks, however, are bulky, largely point-to-point loop—or star-based systems. For the most part, such systems are tethered systems limiting the mobility and flexibility of their users. Such system is depicted, in part, in FIG. 1. As shown in FIG. 1, a twisted cooper-pair (e.g. Ethernet) network is established using router/switch 142. The router/switch 142 is physically connected to a first computer 146 and a second computer 144. In operation, the muter switch acts to route data between the computers and/or that originates from a third source such as the Internet 102. In Internet context, the router/switch 142 cooperates with some broadband modem 120 to switch data packets to and from cooperating Internet computers. Generally, copper-pair or coaxial-based transport systems are bi-directional and typically have a high degree of reliability. They require the use of Category 5 (CAT5) or bulky coaxial cabling, and are typically expensive to install between rooms after a house has been built. Some home networks have Ethernet cabling, but because of its expense and difficulty to install, few have chosen to use it.

It is worth noting that twisted pair Ethernet solutions are often deployed in a star topology with a collapsed backbone. This is typically called an Ethernet switch. In this topology, individual Ethernet connections are star-connected to a central switch or switches that provide many times the bandwidth among endpoints that a single connection could support in a broadcast environment. For this reason, coaxial Ethernet deployments have all but disappeared.

A second home networking solution contemplates the use of alternating current power-line based transport elements. Alternating current (AC) power lines are readily available as network transport elements throughout the home. They are used as transport facilities to send and receive discrete frequency-based control, monitoring, and communications messages to smart devices that manage lighting and environmental systems ("turn off," "turn on," and "dim"). They also are used as voice-communication elements for telephone extensions, computer-modem access, and intercom devices through standard electrical outlets. Recently, data solutions at Ethernet speeds have emerged for power line networks and adapters allow substitution of traditional Ethernet installations with power line technology. Throughput for any application requiring higher data rates can be a challenge, because the power line technologies do not allow for a collapsed backbone, like was described for Ethernet. Instead, the technology is akin to the coaxial Ethernet broadcast backbones. Even with this limitation, this technology remains useful and is becoming more prevalent in homes—perhaps largely because of the convenience of electrical outlets that are plentiful compare to the other outlets in the home.

An alternative solution takes advantage of using the existing telephone wiring found in most homes. The Home Phone Network Alliance (Home PNA) is one organization dedicated to the development of standards and specifications for interoperable home-networked devices that use existing twisted-pair phone wiring. However, current implementations of HomePNA work like the power line technologies and do not support multiple independent phone wiring topologies on a customer premises for providing switched data and routed network services. The current implementation of HomePNA limits the ability of providing bandwidth intensive, security sensitive, or Quality of Service (QOS) demand applications. Packet telephone and multimedia content delivery are two such services that would benefit from a Home-PNA switched network architecture.

From the foregoing it is appreciated that there exits a need for a bandwidth and topology management device that overcomes the prior art.

SUMMARY OF THE INVENTION

Systems, methods, and equipment for use in the management of network topology and bandwidth for computing networks are provided. In an illustrative implementation an exemplary network topology and bandwidth management device acting as a patch panel is provided The patch panel works on both the physical wire and on the frequencies of the wire to route data to appropriate destination points. For example, both ADSL and telephony could be bridged among copper wires, using several independent busses. Home Phone Network Alliance Association (HPNA) standardized data could either be bridged among wires, or connected to an internal switching device, that would store and forward the native Ethernet packets used by HomePNA in a way similar to that done by Ethernet switches today. Additionally, an Ethernet uplink (possibly supporting 802.1Q) could attach the HPNA ports to a larger network or to a residential gateway, and HPNA/ADSL could be removed from wires that might have privacy concerns or otherwise need filters to perform properly.

In the contemplated implementation, the exemplary device comprises a control circuit and control logic that operates on various data transmission lines (e.g. telephone copper transmission lines). In operation, the control circuit executes at least one instruction set to determine the frequency of data being transmitted along the transmission line. Using the results of this determination, the control circuit selects the appropriate ports for routing the data being communicated through the transmission line. Once selected, the data is routed accordingly.

Other aspects of the invention are described below.

BRIEF DESCRIPTION OF THE DRAWINGS

The system and methods for providing topology and bandwidth management for telephone-wire based networks are further described with reference to the accompanying drawings in which.

DETAILED DESCRIPTION OF ILLUSTRATIVE EMBODIMENTS

Overview

The herein described systems and methods aim to ameliorate the shortcomings of exiting practices, devices, and techniques by providing independent management of the HomePNA infrastructure topology from that of the phone service—allowing, for example multiple phone lines to provide a single data network, or conversely, a single phone line to support a switched data network—or even independent data networks. While HomePNA and the telephone service share the same physical copper, they use independent frequency spectra on that copper plant. In an exemplary implementation, the herein described systems and methods may embody a device that performs a function similar to a "patch panel." The difference is that is operates not only on physical wires, but also on the different frequencies on those wires. Thus, a single copper phone line inserted into this device would be broken-out or de-multiplexed into its telephony, HPNA (and ASDL) frequency components. These would then be associated with an appropriate "patch panel technology."

For example, both ADSL and telephony could be bridged among copper wires, using several independent busses. HPNA could either be bridged among wires, or connected to an internal switching device, that would store and forward the native Ethernet packets used by HomePNA in a way similar to that done by Ethernet switches today. Additionally, an Ethernet uplink (possibly supporting 802.1Q) could attach the HPNA ports to a larger network or to a residential gateway, and HPNA/ADSL could be removed from wires that might have privacy concerns or otherwise need filters to perform properly. Management of this bridging switching function could be manual (using physical switches) or via an electronic interface (like a web-browser). A typical implementation might provide this invention in a package that compliments various structured wiring solutions for the home or small office. Finally, several devices with various sizes might be produced to meet different needs at different price-points.

Prior Art

FIG. 1 is a prior art diagram of an exemplary home environment 100 and prior art network topologies for use in home data, computing, and telephone networks. Home environment 100 comprises a house 104. The house 104 is connected to various services such as telephony, power, and broadband communications. Specifically, house 104 is connected to the telephone network 108 through a telephone network splitter 111. Voice travels from the telephone network 108 through telephone network splitter 111 to Network Interface Device (NID) 116. From NID 116, the telephone access is wired through house 104 using telephone wiring 126 in various topologies and terminated on telephone jacks 130. The telephone jacks 130 are connected to telephones 132 which complete the telephone network. The telephony network also serves to provide data communications through digital subscriber line (DSL) services. In this context, data is communicated to and from the Internet 102 through DSL Access Multiplexer (DSLAM) 106 and network splitter 111 that is in turn connected to house 104 through NID 116 using DSL frequencies on local loop 112. In house 104, the DSL communications are propagated through the house from DSL jack 118. Jack 118 is differentiated from Jack 130 by either: 1) micro-filters (not shown) at each jack to select the voice or ADSL frequencies; or 2) a NID-based splitter (like 111) that splits the voice and DSL frequencies and propagates them into the house 104 using separate phone lines 126. From DSL jack 118, data travels to DSL modem 122. In the provided implementation, DSL modem 122 is connected to router/switch 142. Router/switch 142 acts to route data from the Internet received over the DSL connection to the various computers in house 104 such as computers 136, 144, and 148. The router/switch may have wireless capabilities so as to transmit such data wirelessly to the computers in house 104 as shown by computer 136. In an alternative implementation (not shown), the various computers may be directly connected to the described DSL connection. However, in this context, a physical direct connection is required rendering a single connection to the Internet (i.e. only one computer).

Furthermore, home environment 100 shows house 104 being connected to the Internet via a dedicated broadband line. In this context, the broadband line may comprise an Internet connection using cable and/or satellite systems [not shown]. This Internet connection arrives at house 104 at broadband panel 114 and is routed to broadband (e.g. cable) modem 120 using cabling 124. For example, the cable company may deliver the cable to broadband panel 114 that in turn is propagated through the house using cabling 124. The cabling terminates at broadband modem 120 that in turn is connected to a router/switch 142 for use in routing/switching data packets to cooperating devices (such as computers 144 and 148). The data communicated from broadband modem 120 to router/switch 142 may experience, inter alia, a frequency change to accord for the Ethernet network topology generally supported by currently implemented routers/switches. Further, as shown, router/switch may also have wireless capabilities that allow it to communicate and receive data wireless using the Ethernet network topology to cooperating computers such as computer 136. In this context, computer 136 would itself have to maintain wireless data communication capabilities.

Also shown in FIG. 1, is the delivery of power services to house 104. Alternating current power is delivered from utilities (not shown) through power transmission lines and poles 140 to electrical panel 138. From electrical panel 138, power is distributed throughout house 104 using electrical wiring 128 to electrical receptacles 134. Electrical wiring 128 may serve as an alternate network topology. As is shown an Internet connection may be established using the electrical wiring 128 of house 104. In this context data is communicated to and from the Internet through either of the telephony networks or the cable/satellite providers to the telephony or broadband modems, respectively. The data is then communicated through power data translator 152 for communication along electrical lines 128 to a cooperating personal computer 154. In this context, for computer 154 to realize its connection to Internet 102, it should be equipped with power-data translation capabilities.

Figure 2:
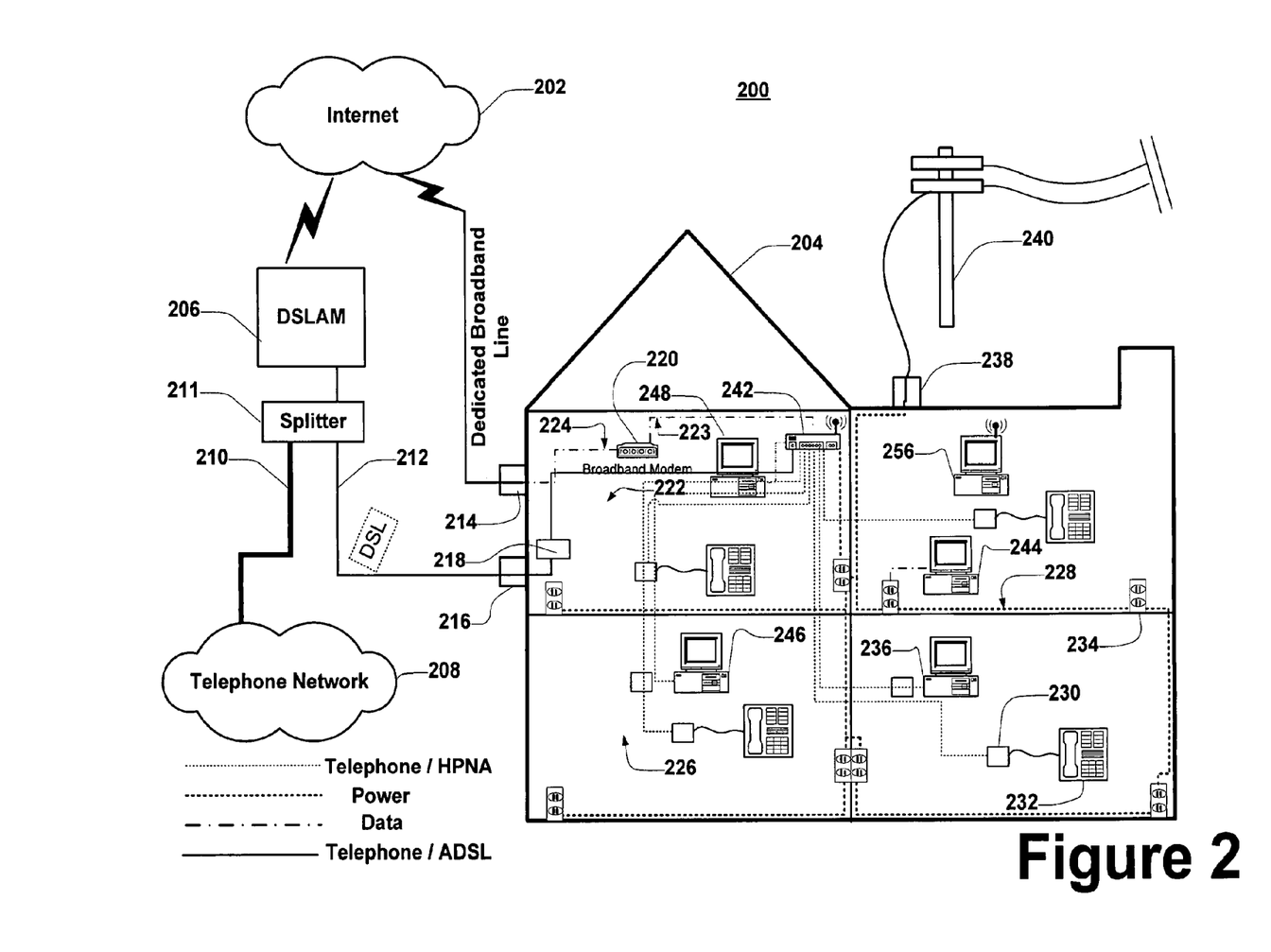
FIG. 2 is a block diagram of a home networking environment in accordance with the herein described systems and methods.

FIG. 2 shows a block diagram of an exemplary home environment 200 having unified network topology and bandwidth management capabilities. Home environment 200 comprises a house 204. The house 204 is connected to various services such as telephony, power, and broadband communications. Specifically, house 204 is connected to the telephone network 208 through a telephone network splitter 211. Voice travels from the telephone network 208 through telephone network splitter 211 to Network Interface Device (NID) 216. From NID 216, the telephone access is wired using standard telephony wire 222 to the network topology and bandwidth management device 242. The network topology and bandwidth management device is configured such that telephony signals are propagated or bridged through house 204 using telephone wiring 226 in a star topology and terminated on telephone jacks 230 where there are actually telephone instruments present. The telephone jacks 230 are connected to telephones 232 which complete the telephone network. The telephony network also serves to provide data communications through digital subscriber line (DSL) services. In this context, data is communicated to and from the Internet 202 through DSL Access Multiplexer (DSLAM) 206 and network splitter 211 that is in turn connected to house 204 through NID 216 using DSL frequencies on local loop 212. In house 204, the DSL communications are propagated, once again, using standard telephony wire 222 to the network topology and bandwidth management device 242. In this example, the network topology and bandwidth management device subsumes the capabilities of the DSL modem 122 shown in FIG. 1, and contains, by means of its bandwidth management capability, the ability to differentiate voice from ADSL frequencies. Thus, no micro-filters (not shown) are needed at any jack to select the voice or ADSL frequencies; nor is a NID-based splitter (like 211) required. In the provided implementation, unified network topology and bandwidth management device 242 acts to route data from the Internet received over the DSL connection to the various computers in house 204 such as computers 236, 244, 246, 248, and 256. Network topology and bandwidth management device 242 may have wireless capabilities so as to transmit such data wirelessly to the computers in house 204 as shown by computer 256.

Furthermore, home environment 200 shows house 204 being connected to the Internet via a dedicated broadband line. In this context, the dedicated broadband line may comprise an Internet connection using cable and/or satellite systems (not shown). The dedicated Internet connection arrives at house 204 at broadband panel 214 and is routed to broadband modem 220 using cabling 224. For example, the cable company may deliver the cable to broadband panel 214 that in turn is propagated through the house using cabling 224. The cabling terminates on the cable modem 220 and a separate cable 223 delivers the Internet connection to network topology and bandwidth management device 242 for use in routing/switch data packets to cooperating devices (such as computers 236, 244, 246, and 248 through the various house wires). The data communicated from network topology and bandwidth management device 242 to one of the terminating computers may experience, inter alia, a frequency change to accord for the network topology adapter present at the termination point. Further, as shown, network topology and bandwidth management device 242 may also have wireless capabilities which allow it to communicate and receive wireless data using the one of the various network topologies to cooperating computers such as computer 256. In this context, computer 256 would itself have to maintain wireless data communication capabilities.

Also shown in FIG. 2, is the delivery of power services to house 204. Alternating current power is delivered from utilities (not shown) through power transmission lines and poles 240 to electrical panel 238. From electrical panel 238, power is distributed throughout house 204 using electrical wiring 228 to electrical receptacles 234. Electrical wiring 228 may serve as an alternate network topology. As is shown an Internet connection may be established using the electrical wiring 228 of house 204. In this context data is communicated to and from the Internet through either of the telephony networks or the cable/satellite providers to the network topology and bandwidth management device 242. The data is then communicated through network topology and bandwidth management device 242 along electrical lines 228 to a cooperating personal computer 244. In this context, for computer 244 to realize its connection to Internet 202, it should be equipped with power-data translation capabilities.

As such, network topology and bandwidth management device 242 acts as a gateway for all of the network topologies found in the home. Using either of, and/or a combination of, network topology and bandwidth management device 242 accepts data and voice inputs from telephone service providers, cable/satellite providers for communication along one of the existing telephone wiring 226, electrical wiring 228, wireless communication (not shown), or coaxial wiring (not shown) to create a communications network. Data inputted into the network topology and bandwidth management device 242 is switched and routed according to any one or more of these network topologies for delivery to cooperating devices such as telephones and computers. The network topology and bandwidth management device 242, thus, acts as a single point of entry for various data and voice services for communication to cooperating devices using existing house wiring. Moreover, network topology and bandwidth management device 242, when operated, acts to manage the bandwidth allocations across the house networks such that data is efficiently communicated to the cooperating termination devices.

Figure 3:
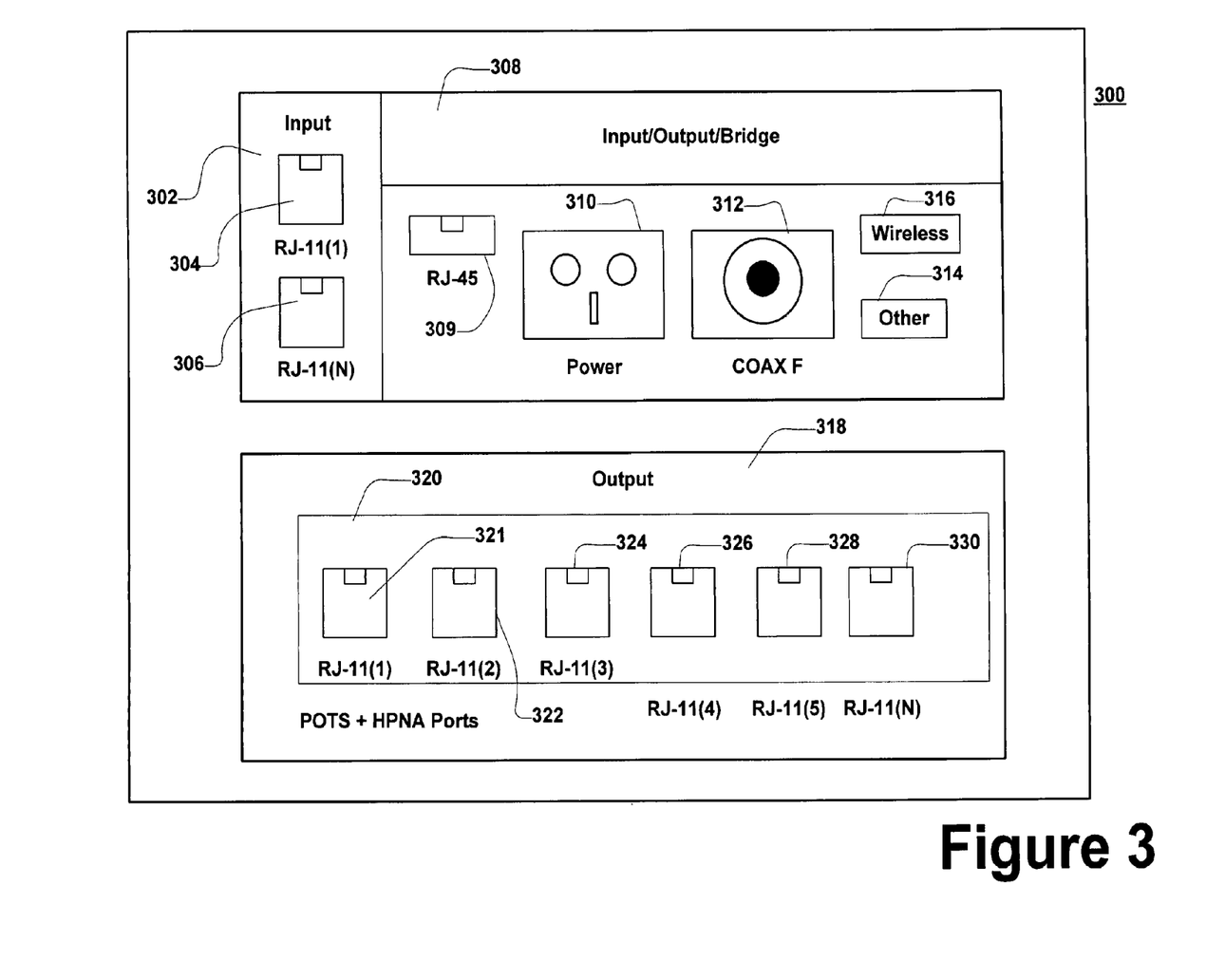
FIG. 3 a block diagram of an exemplary device and its components for use in network topology and bandwidth management.

FIG. 3 shows a block diagram of an exemplary device for use in the herein described systems and methods. As is shown, network topology and bandwidth management device 300 comprises input/output bridge 308, and output ports 318. Specifically, input/output bridge portion 308 comprises RJ-45 jack 309, power connector 310, coax F connector 312, wireless connector 316, and an expansion slot 314 for additional connection types. Also contained within input/output/bridge portion 308 is input portion 302 which comprises one or more RJ-11 type ports (e.g. RJ-11(1) and RJ-11(N)) ports), 304 and 306 respectively that are used to accept connections from one or more telecommunications services as was shown in FIG. 2 at connection 222. An output portion of network topology and bandwidth management device 300 comprises a number of POTS and HPNA ports: RJ-11(1) 321, RJ-11(2) 322, RJ-11(3) 324, RJ-11(4) 326, RJ-11(5) 328, to RJ-11(N) 330. It is appreciated that a number of input ports and output ports are described, that such description is merely exemplary as the inventive concepts described herein may be applied to a network topology and bandwidth management device having varying numbers of ports arranged in various configurations.

In operation, the input/output/bridge portion 308 and input portion 302 accept various input sources from existing or created wiring configurations. Stated differently, network topology and bandwidth management device 300 will accept Ethernet wires from a cooperating Ethernet network at RJ-45 port 309, AC power wires at Power port 310 (from which both power is obtained and data is communicated), coaxial wiring from a cooperating coaxial network at COAX F port 312 (over which data is communicated using either DOCSIS or HPNA over Coax). In the context of wireless transmission, network topology and bandwidth management device 300 contains a wireless adapter 316 that has the ability to communicate data wirelessly. In addition, network topology and bandwidth management device 300 also accepts as input standard telephone wiring which is part of a telephone network at input ports 304 and 306. Multiple ports are provided to accommodate multiple POTS lines. Comparatively, at the output, network topology and bandwidth management device 300 comprises a number of telephone ports for use as part of communicating data using one of more of the HPNA standards.

Data traveling between points across these disparate networks will travel through network topology and bandwidth management device 300 where the data rate or data frequency is shifted, changed, and/or modified in accordance with how the data is to be routed. For example, in an exemplary home, the homeowner decides to exploit the existing electrical wiring to create a local area network, the network topology and bandwidth management device 300 is used as the switch/router to route/switch data between the homeowner's PCs connected using the electrical wiring (it is appreciated that the PCs would need to be fitted with the proper adapter(s) to be able to communicate data across electrical wiring). In this scenario, network topology and bandwidth management device 300 would accept electrical wiring in the input/output/bridge portion 308 to realize the flow of data between the cooperating PCs. In a similar scenario, network topology and bandwidth management device 300 may act as a gateway between two PCs wanting to exploit existing telephone wiring. In this context the HPNA standard would be employed to communicate the data. In practical senses a first telephone wire is coupled to the output 318 portion of the network topology and bandwidth management device 300 and a second telephone wire is directed from the output 318 portion to a termination point. It doesn't matter which ports are used in the output portions as the network topology and bandwidth management device will route the data according to determination of which ports are active and with some predefined addressing information. For example, the network topology and bandwidth management device 300 would be configured to switch Ethernet packets among the ports that were chosen to attach the two PCs.

Figure 4:
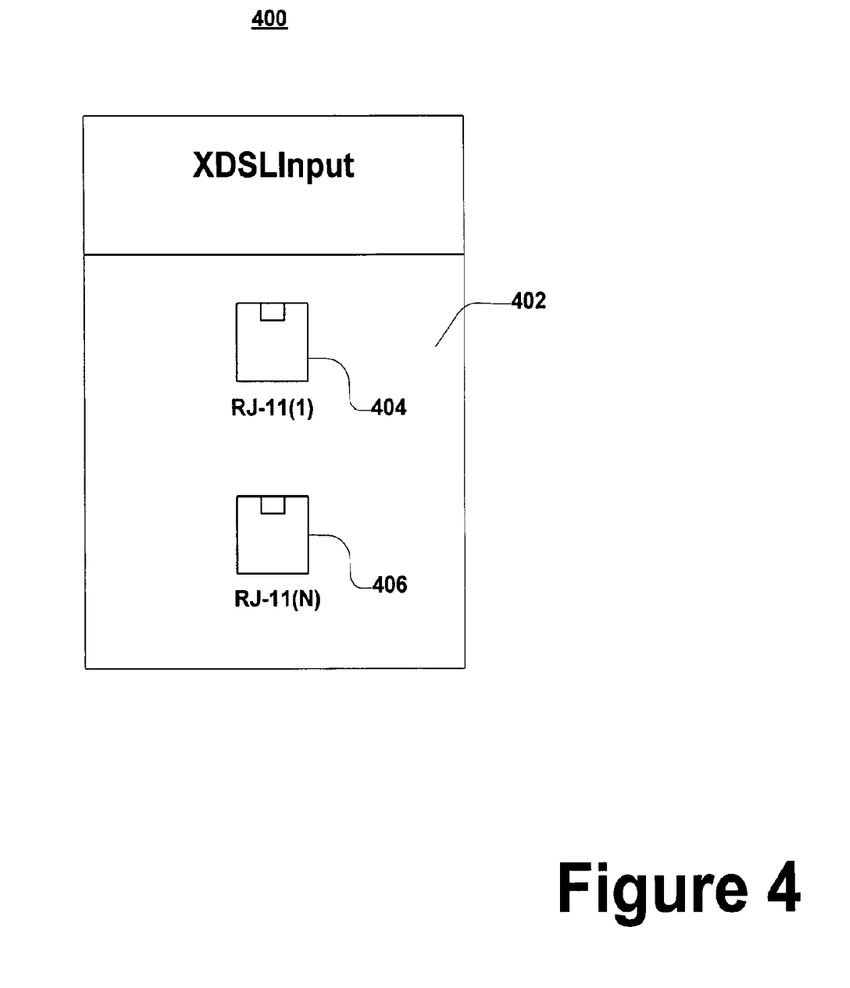
FIG. 4 is a is a block diagram of an exemplary port configuration for use in broadband communications in accordance with herein described systems and methods.

FIG. 4 shows a block diagram of an additional feature for supporting DSL for use in the device described in FIG. 3. As show in FIG. 4, input portion of network topology and bandwidth management device 300 may also comprise XDSL inputs 400. XDL inputs 400 comprise a port area 402 that contains one or more RJ-11 type ports 404 and 406. In operation, DSL RJ-11 jacks may be connected to network topology and bandwidth management device 300 using the RJ-11 type ports 404 and 406. In this context, a DSL connection may be propagated throughout a building using network topology and bandwidth management device 300. These ports would replace 304 and 306 in FIG. 3 and would continue to provide POTS input in addition to DSL input.

Figure 5:
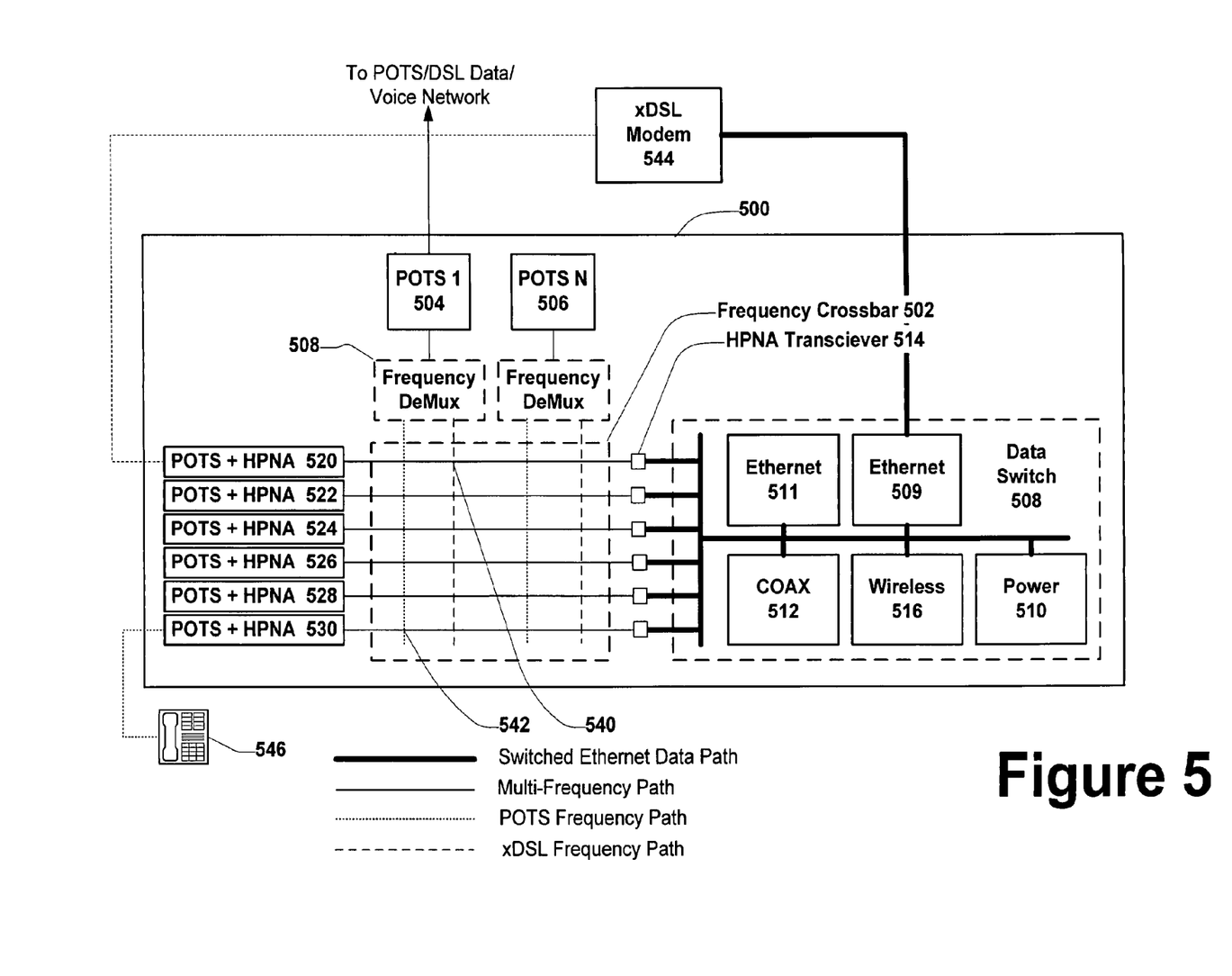
FIG. 5 is a block diagram of the components of an exemplary device for use in network topology and bandwidth management.

FIG. 5 shows a block functional diagram of the various components of a network topology and bandwidth management device. As is shown, network topology and bandwidth management device 500 comprises all the various physical ports described in Figures 3 and 4. Notably, the option of managing ADSL frequencies as described in FIG. 4 is included in this Figure. Within network topology and bandwidth management device 500 there comprises Frequency DeMux 508, Frequency Crossbar 502, HPNA transceivers 504 and Data Switch 508.

Frequency DeMux 508 separates the POTS telephony signals from the xDSL signals that are communicated through ports POTS1-N. It presents these signals to the Frequency Crossbar 502 so that they may be distributed among ports POTS+HPNA 520-530. Frequency DeMux also ensures that HPNA signals are not emitted from ports POTS1-N.

Frequency Crossbar 502 provides a frequency-topology management function among the POTS, xDSL, and HPNA frequency domains. For a given POTS+HPNA port, a Multi-Frequency path exists that is comprised of signals bridged onto that path by the Frequency Crossbar. The bridged signals may be selected from a POTS frequency path, an xDSL frequency path, and/or a dedicated HPNA Transceiver 514.

HPNA Transceivers 514 are provided in a 1:1 correspondence to the POTS+HPNA ports. They bridge data packets from the HPNA frequency domain to the Data Switch. HPNA signals can be enabled or disabled on a given POTS+HPNA port by enabling or disabling the associated HPNA transceiver. (Note also that other embodiments of the invention may adopt a more sophisticated Frequency crossbar that allows selection of an HPNA Frequency Path, and that such an embodiment would not require HPNA transceivers that can be enabled and disabled. Also, such an embodiment might provide fewer HPNA transceivers than POTS+HPNA ports, with the result that not every POTS+HPNA port could benefit from switched data paths.)

Data Switch 508 connects Ethernets 509 & 511, COAX 512, Wireless 516, Power 510 and various HPNA 520-530 ports. Data Switch 508 can optionally comprise VLAN logic that would allow multiple logical data networks to be created within the physical network topology. It is understood that various embodiments of the network topology and bandwidth management device might have differing numbers of Ethernet, COAX, and Wireless ports—for example to enhance the optional VLAN capability or to provide greater physical data throughput.

As was described before, the network topology and bandwidth management device may or may not comprise the xDSL modem functionality. If an xDSL modem 544 were external to network topology and bandwidth management device 500 then it would be, for example, connected between a POTS+HPNA port 520 and an Ethernet port 509. A similar connection would exist if the network topology and bandwidth management device comprised the xDSL modem—albeit, in the latter arrangement the DSL modem would be assigned to internal connections and not to physically exposed exterior ports.

In operation, voice and data may originate/terminate at the POTS/DSL data/voice networks. In the instance that voice originates/terminates at the POTS network, voice signals travel through the PSTN (Public Switched Telephone Network) as well as through a POTS 1 interface 504 to a Frequency DeMux 508. The POTS signal is then separated from other potential signals present at the POTS interface 504 and routed to a POTS Frequency path 542 in the Frequency Crossbar 502 that is associated with the POTS 1 interface 504. Through user administration of the network topology and bandwidth management device or potentially through electrical identification through associated POTS+HPNA ports (auto-configuration) the POTS frequency path 542 is connected to one or more desired POTS+HPNA ports 520-530 by bridging its signal onto the Multi-Frequency path associated with the desired POTS+HPNA ports. In this example, an analog telephone 546 wired to POTS+HPNA port 530 would be enabled by bridging the POTS frequency path with the Multi-frequency path at point 542. The entire function can be disabled by simply not bridging POTS frequency path 542 to any POTS+HPNA port.

In the instance data originates/terminates at the POTS/DSL data/voice network, data signals travel through the PSTN as well as through a POTS interface 504 to a Frequency DeMux 508. The xDSL signal is then separated from other potential signals present at the POTS interface 504 and routed to a xDSL Frequency path 540 in the Frequency Crossbar 502 that is associated with the POTS 1 interface 504. Through user administration of the network topology and bandwidth management device or potentially through electrical identification through associated POTS+HPNA ports (auto-configuration) the xDSL frequency path 540 is connected to a desired POTS+HPNA port (e.g. 520) by bridging its signal onto the Multi-Frequency path associated with the desired POTS+HPNA port. In this example, an xDSL Modem 544 wired to POTS+HPNA port 520 would be enabled by bridging the xDSL frequency path with the Multi-frequency path at point 540. The entire function can be disabled by simply not bridging xDSL frequency path 540 to any POTS+HPNA port.

In both the xDSL and Cable modem embodiment types, the Ethernet output of the modem is connected to an Ethernet port 509 on the network topology and bandwidth management device 500. Those skilled in the art will realize that xDSL or Cable modems that support network interfaces other than Ethernet can connect to the corresponding data network port (i.e. COAX, Wireless, Power, HPNA or Other) with similar results. Notably, the "Other 314" port shown in FIG. 3 might support a USB (Universal Serial Bus) connection to the xDSL or Cable modem instead of Ethernet.

From Ethernet port 509 the appropriate network topology adapter is chosen based on the destination of the data packet. If the data is to be routed to/from an HPNA device the appropriate HPNA transceiver 514 is then selected. Comparatively, if the data is to be routed to/from a COAX network, COAX adapter 512 is chosen. Similarly, if the data is to be routed to/from a wireless network, wireless adapter 516 would be selected. Lastly, if the data is to be routed to/from a power line network, power adapter 510 would be selected.

It should be noted that all of the network ports (Ethernet, COAX, Wireless, Power, and HPNA) allow multiple devices to share a single physical access. Therefore, multiple data devices might share a single data switch port as is common in the art of Ethernet networks. Furthermore, both a telephone and a PC may be attached to the same POTS+HPNA port. This might be desired when a single phone jack located somewhere in the home should provide both voice and data signals to attached telephone and PC devices. Bridging the POTS frequency path to the Multi-frequency path and also enabling the HPNA transceiver for a particular POTS+HPNA port would support this arrangement.

It is appreciated that although network topology and bandwidth management device 300/500 has been described to have particular configurations and operations, that such description is merely exemplary as the inventive concepts described herein extend beyond such description such that network topology and bandwidth management device 300/500 may comprise various adapters having various configurations for use on various networks. Similarly, the term PC is meant to comprise any element capable of data communication in the described embodiments—and embodiments exist with hybrid and/or converged devices. An example of the latter would include a PC device that comprises both a data modem as well as an HPNA data adapter.

Figure 6:
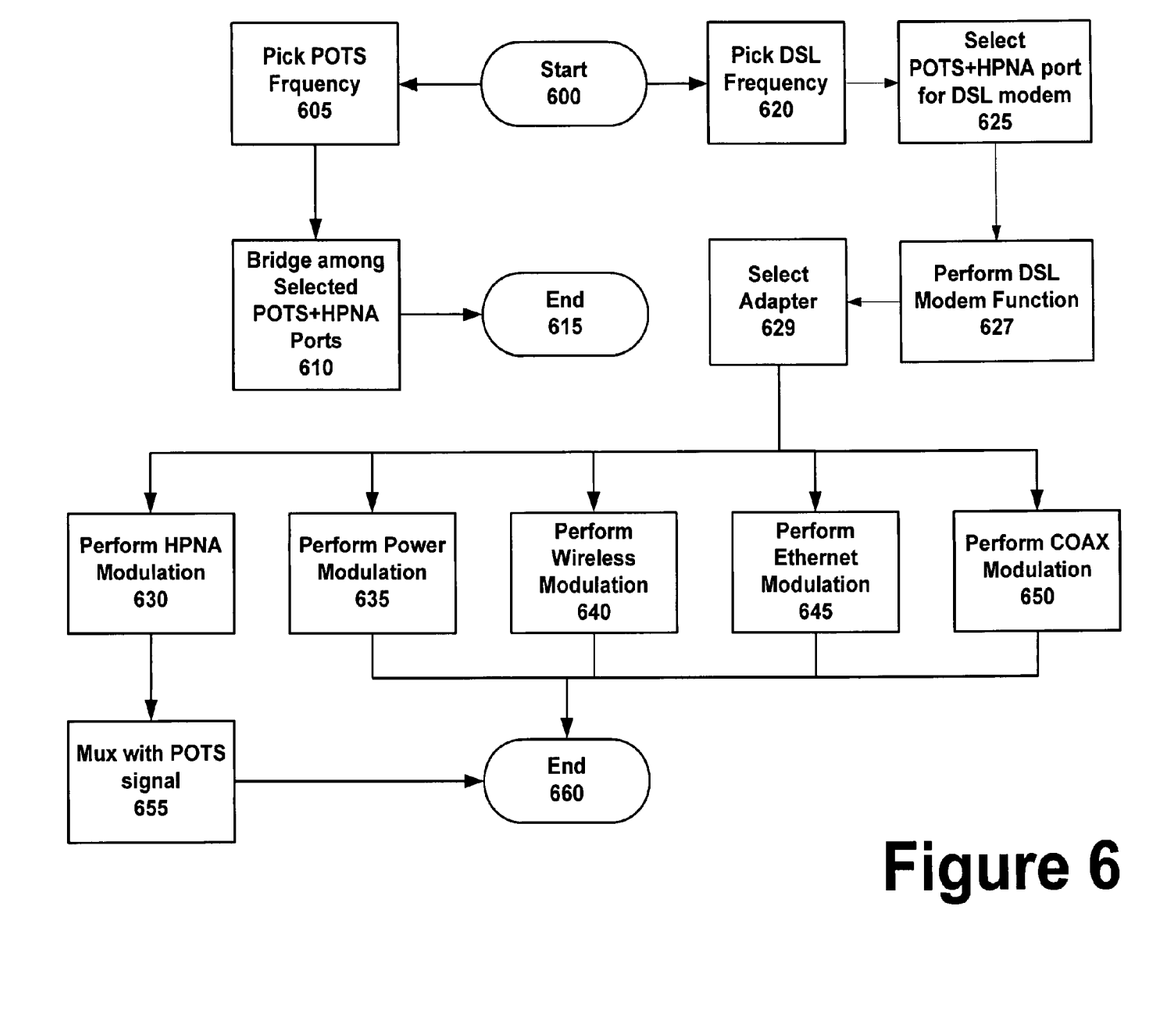
FIG. 6 is a flow diagram of the processing performed when routing data across a data network in accordance with the herein described systems and methods.

FIG. 6 shows a flow chart of the processing performed by the exemplary device in routing voice and data among the POTS ports and the exemplary network. As is shown, processing begins at block 600 and proceeds either to block 605 or 620 based on the signal type. At block 605 a plain old telephone service (POTS) signal is input. In this context, voice data is being selected to communicate across the home network to the appropriate termination point(s) (e.g. telephone). From there processing proceeds to block 610 where the POTs signal is bridged to a chosen set of POTS+HPNA ports to route the telephone voice data. Processing then terminates at block 615. At block 620, a DSL signal is input. In this context data traffic is being selected to communicate across the network. Processing then proceeds to block 625 where the DSL signal is bridged to the appropriate POTS+HPNA port needed to reach the DSL modem. Processing then proceeds to block 627 where the signal is transformed to

[Ethernet] data packets by the DSL modem. Processing then proceeds to block 629 where the data switch selects the appropriate destination based on Ethernet address. The destination address also chooses the appropriate adapter among the available networking technologies offered in the house and present in cooperating devices in the house. That is, if a PC is the terminating point, the type of adapter chosen will depend on Ethernet address embedded in the various kind(s) of network adapter(s) present in the PC. The herein described systems and methods, as described above, contemplate the use of alternating current power lines, wireless technologies, Ethernet, HPNA, and coaxial networking topologies. Accordingly, if at block 629, an AC power adapter is selected, processing proceeds to block 635 where the data is switched to an adapter that modulates the data at the appropriate frequency and routes to the terminating point. From there processing terminates at block 660. Comparatively if a the data is to be switched and/or routed via a wireless networking standard (topology), processing jumps from block 629 to block 640 where the data is switched and/or routed via the wireless network to the termination point. From there processing terminates at block 660. Similarly, if at block 629, the data is to be switched and/or routed over an Ethernet network topology to the termination point, processing proceeds to block 645, where the data is switched and/or routed using the Ethernet standard. Similar processing is performed if at block 629 it is determined that the data is to be switched and/or routed using a coaxial network topology. That is, from block 629, processing then proceeds to block 650 where the data is switched and/routed using a coaxial network topology. Similarly, if at block 629, it is determined that the data is to be routed and/or switched over an HPNA network topology, processing proceeds from block 629 to block 630 where the appropriate HPNA port and transceiver is chosen (i.e. the appropriate HPNA port and its associated transceiver assigned to the desired termination point). From there, other potentially desired signals are multiplexed into the port at block 655 and processing terminates at block 660.

Figure 7:
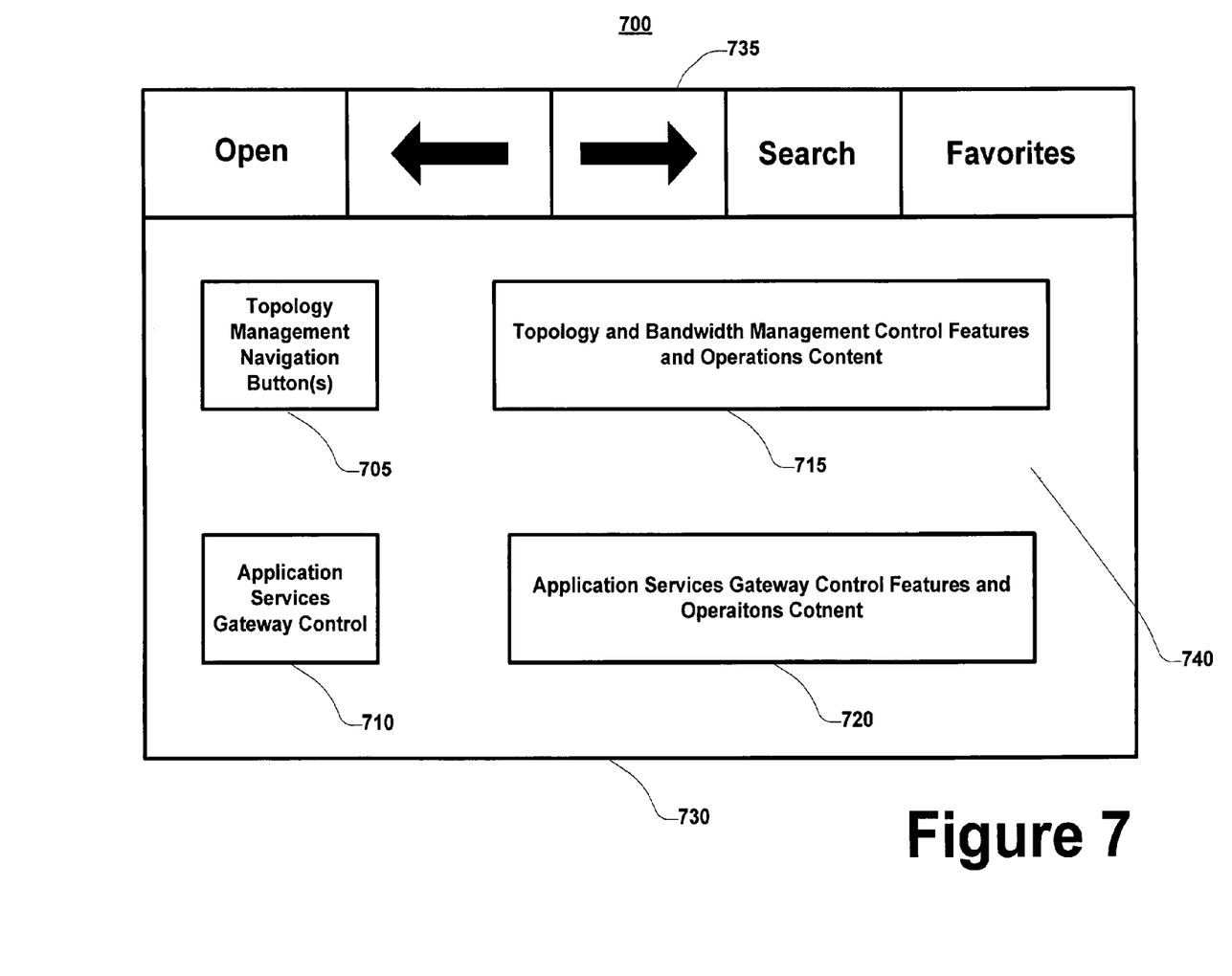
FIG. 7 is an exemplary screen shot of a graphical UI for use in controlling an exemplary device for use in network topology and bandwidth management.

FIG. 7 shows a screen shot of a graphical user interface for use to control the operations and features of the exemplary network topology and bandwidth management device. As is shown, exemplary screen shot 700 comprises computing browsing application 730 having navigation buttons 735 for navigation through content found in display area 740. Specifically in display area 740 there are topology management navigation buttons 705 for use to input, display, and manage topology and bandwidth management control features and operations content found in display box 715. In addition, display area 740 contains application services gateway control 710 for use to input, display, and manage application services gateway control features operations content found in display box 720. In operation, the topology management navigation buttons trigger the execution of one or more instruction sets to configure a cooperating exemplary network topology and bandwidth management device. Included in the configuration information may be network addressing information, wireless encryption information, and network/bandwidth topology information. Similarly, application services gateway control 710, when executed, triggers one or more instruction sets to instruct the exemplary network bandwidth topology and bandwidth management device to configure the exemplary device to cooperate with application services provided by the cooperating telephony company. In this context, the exemplary device acts as a gateway for a plethora of value-added services that may be offered by the telephone company, such as video on demand, music on demand, remote security applications, and video conferencing that are delivered to the various cooperating devices in the home such as the personal computer, telephone, security cameras, television, etc.

CONCLUSION

In sum, the herein described systems and methods provide a network topology and bandwidth management system for use on telephone-wire based networks. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of computer environments (including both non-wireless and wireless computer environments), partial computing environments, and real world environments. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in specific and predefined manner.

Although an exemplary implementation of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention. The invention may be better defined by the following exemplary claims.

The invention claimed is:
1. A method, comprising:
   determining a source of data signals for communication to a termination point having a predetermined operational signal frequency;
   separating telephony signals from digital subscriber line signals in a frequency demultiplexer;
   sending the telephony signals from an output of the frequency demultiplexer to an input of a frequency crossbar that bridges inputs to different transceivers and to different telephony ports;

bridging the telephony signals to one of the telephony ports based on frequencies of voice signals in the telephony signals;

sending the digital subscriber line signals from another output of the frequency demultiplexer to another input of the frequency crossbar;

bridging the digital subscriber line signals to a different one of the telephony ports in the frequency crossbar based on the frequencies of the digital subscriber line signals; and selecting an Ethernet output port and bridging the digital subscriber line signals onto a path through the frequency cross bar that connects to the Ethernet output port.

2. The method according to claim 1, further comprising bridging the digital subscriber line signals in the frequency crossbar to one of the transceivers.

3. The method according to claim 1, further comprising bridging the input of the frequency crossbar to one of the transceivers.

4. The method according to claim 1, further comprising determining the frequencies of the telephony signals.

5. The method according to claim 4, further comprising selecting the output of the frequency demultiplexer based on the frequencies of the telephony signals.

6. The method according to claim 1, further comprising determining the frequencies of the digital subscriber line signals.

7. The method according to claim 6, further comprising selecting the one of the telephony ports in the frequency crossbar based on the frequencies of the digital subscriber line signals.

8. An apparatus, comprising:
a processor; and
memory storing instructions that when executed cause the processor to perform operations, the operations comprising:

determining a source of data signals for communication to a termination point having a predetermined operational signal frequency;

separating telephony signals from digital subscriber line signals in a frequency demultiplexer;

sending the telephony signals from an output of the frequency demultiplexer to an input of a frequency crossbar that bridges inputs to different transceivers and to different telephony ports;

bridging the telephony signals to one of the telephony ports based on frequencies of voice signals in the telephony signals;

sending the digital subscriber line signals from another output of the frequency demultiplexer to another input of the frequency crossbar;

bridging the digital subscriber line signals to a different one of the telephony ports in the frequency crossbar based on the frequencies of the digital subscriber line signals; and selecting an Ethernet output port and bridging the digital subscriber line signals onto a path through the frequency cross bar that connects to the Ethernet output port.

9. The apparatus according to claim 8, wherein the operations further comprise bridging the telephony signals in the frequency crossbar to one of the transceivers.

10. The apparatus according to claim 8, wherein the operations further comprise bridging the input of the frequency crossbar to one of the transceivers.

11. The apparatus according to claim 8, wherein the operations further comprise determining the frequencies of the telephony signals.

12. The apparatus according to claim 11, wherein the operations further comprise selecting the output of the frequency demultiplexer based on the frequencies of the telephony signals.

13. The apparatus according to claim 8, wherein the operations further comprise determining the frequencies of the digital subscriber line signals.

14. The apparatus according to claim 13, wherein the operations further comprise selecting the output in the frequency crossbar based on the frequencies of the digital subscriber line signals.

15. A memory storing instructions that when executed cause a processor to perform operations, the operations comprising:

determining a source of data signals for communication to a termination point having a predetermined operational signal frequency;

separating telephony signals from digital subscriber line signals in a frequency demultiplexer;

sending the telephony signals from an output of the frequency demultiplexer to an input of a frequency crossbar that bridges inputs to different transceivers and to different telephony ports;

bridging the telephony signals to one of the telephony ports based on frequencies of voice signals in the telephony signals;

sending the digital subscriber line signals from another output of the frequency demultiplexer to another input of the frequency crossbar;

bridging the digital subscriber line signals to a different one of the telephony ports in the frequency crossbar based on the frequencies of the digital subscriber line signals; and selecting an Ethernet output port and bridging the digital subscriber line signals onto a path through the frequency cross bar that connects to the Ethernet output port.

16. The memory according to claim 15, wherein the operations further comprise bridging the output port of the frequency crossbar to one of the transceivers.

17. The memory according to claim 15, wherein the operations further comprise bridging the input of the frequency crossbar to one of the transceivers.

18. The memory according to claim 15, wherein the operations further comprise determining the frequencies of the telephony signals.

19. The memory according to claim 18, wherein the operations further comprise selecting the output of the frequency demultiplexer based on the frequencies of the telephony signals.

20. The memory according to claim 15, wherein the operations further comprise determining the frequencies of the digital subscriber line signals.

* * * * *